April 28, 1931. T. B. THURMAN 1,803,042
SPRING ROLLER
Filed July 22, 1929
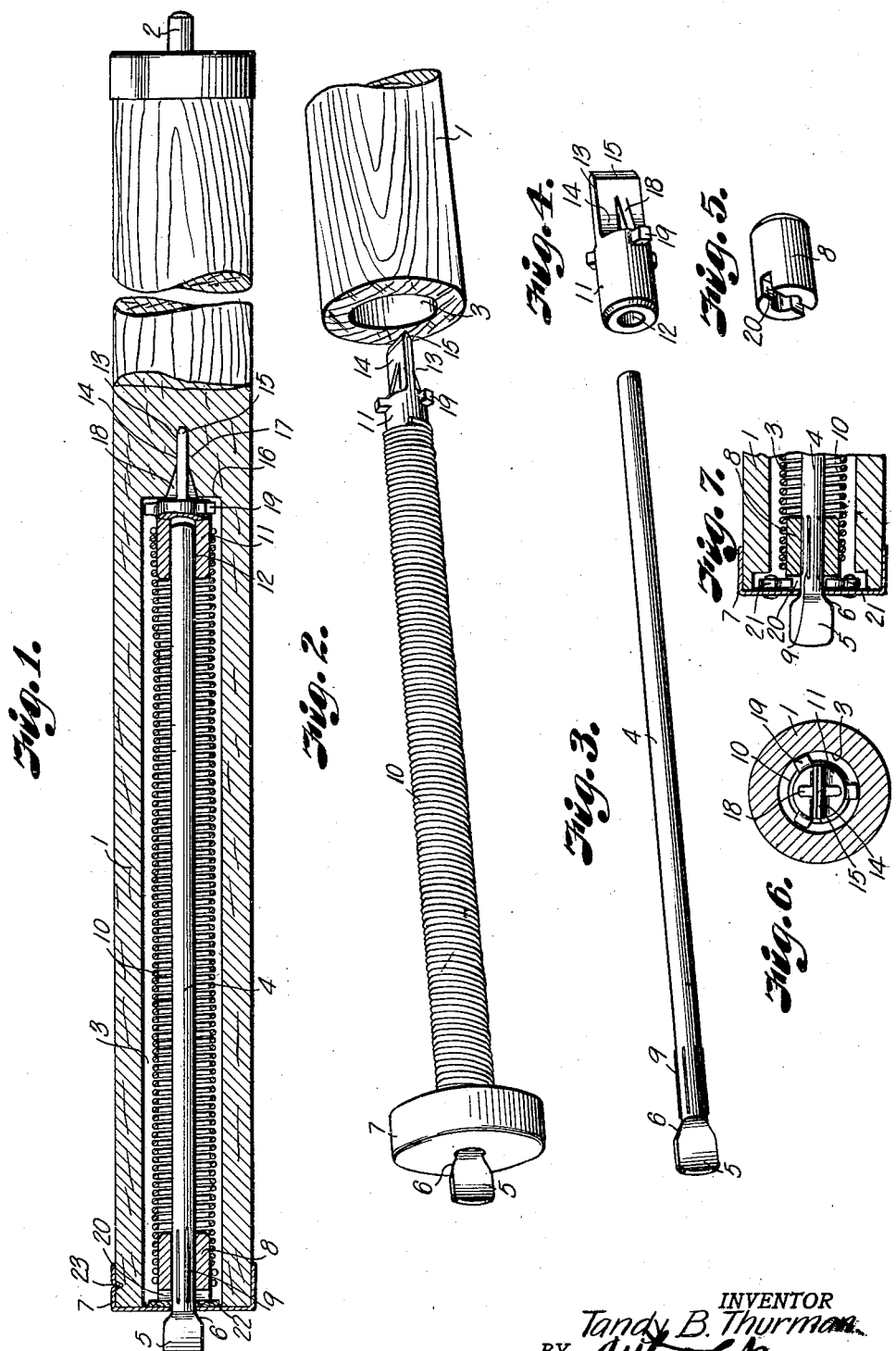
INVENTOR
Tandy B. Thurman
BY
ATTORNEY Patented Apr. 28, 1931

1,803,042

UNITED STATES PATENT OFFICE

TANDY B. THURMAN, OF KANSAS CITY, MISSOURI, ASSIGNOR TO H. E. WILLIAMS PRODUCTS CO., OF CARTHAGE, MISSOURI, A CORPORATION OF MISSOURI

SPRING ROLLER

Application filed July 22, 1929. Serial No. 379,913.

My invention relates to shade rollers, and more particularly to spring rollers, the principal objects of the invention being to facilitate the assembly of parts of a spring roller, to reduce the amount of metal necessary for constructing rollers of this type, and to minimize the cost of production of spring rollers.

In accomplishing these and other objects of the invention, I have provided improved details of structure, the preferred forms of which are illustrated in the accompanying drawings, wherein:

Fig. 1 is a fragmentary view of a spring roller constructed in accordance with my invention, including a longitudinal central section of the spring-equipped end.

Fig. 2 is a perspective view of the spring element in assembled position for mounting in one end of the roller stick, said end being shown fragmentarily.

Fig. 3 is a perspective view of a spring-supporting bar.

Fig. 4 is a perspective view of a spring-anchoring bearing member in which the inner end of the bar rotates.

Fig. 5 is a perspective view of a shoulder-forming sleeve for mounting on the outer end of the bar.

Fig. 6 is a section of the assembled roller illustrating the function of radial lugs on the bearing member for centering the bar in the axial channel of the stick.

Fig. 7 is a longitudinal section of the end portion of a roller provided with latching pawls engageable in slots of the sleeve.

Referring in detail to the drawings:

1 designates a roller comprising a cylindrical wooden body or stick having a spindle 2 fixed to one end for rotatable mounting in a casing bracket in accordance with common practice. The body is provided with an axial cylindrical recess 3 at the other end to receive spring-actuated retracting means, including a bar or shaft 4 having a flattened outer end portion 5 adapted to be mounted in the non-circular slotted socket member ordinarily provided on window casings for such purposes.

The end portion 5 is expanded to form lug-like shoulders 6 for retaining a centrally apertured cap 7 on the shaft. A sleeve 8 is adapted to be moved over the smooth inner end of the shaft and therealong to a position in spaced relation with the shoulders 6 for retaining the cap rotatably at the outer end of the shaft.

Longitudinal ribs or flutes 9 having tapered ends are formed on the shaft adjacent the shoulders 6 and project slightly but sufficiently to engage the inner periphery of the sleeve and secure the sleeve to the shaft in cap-retaining position.

The sleeve has an inner diameter sufficiently greater than the diameter of the shaft to permit the sleeve to be moved easily therealong, and the ribs are relatively thin and project from the shaft sufficiently to form a latching portion of the shaft having slightly greater circumference and diameter than the inner periphery of the sleeve for assuring fixed engagement between the sleeve and the shaft, and limiting the movement of the sleeve on the shaft. The sleeve and ribs yield relatively to each other to permit assembly, the ribs preferably being relatively rigid radially to the shaft and the sleeve yielding slightly, for example being indented by the thin ribs.

Mounted on the shaft is a coil spring 10 having smaller inner diameter than the outer diameter of the sleeve 8 and having its outer end portion mounted on said sleeve and secured thereto, for example by frictional engagement of the convolutions of the end portion tensioned to encircle the sleeve.

The opposite or inner end of the spring is preferably similarly secured to an anchor member 11 having an axial recess 12 in one end forming a bearing socket to receive the inner end of the shaft.

The convolutions of the spring are normally spaced slightly so that the spring may be twisted in either direction from relaxed position to condition it for operation. The spring is of such length that when mounted on the shaft with opposite ends fixed to the sleeve 8 and anchor 11, it serves to retain the inner end of the shaft in the bearing socket, and thus hold the several members in assembled relation to comprise a unit for mounting in the channel of the roller.

The anchor 11 further comprises a wedge-like point 13 comprising a flat plate portion 14 having width substantially equal to the diameter of the cylindrical body of the anchor and extending diametrically thereacross, and a tapering entrance edge 15 adapted to break a path for the plate into the floor 16 of the recess in the roller body for embedding the plate in the body. When the point is inserted, as shown in Fig. 1, a socket 17 is formed thereby in the bottom of the roller recess.

Relatively thin wings 18 tapering toward the entrance edge extend from the end of the cylindrical body of the washer along the axis of the plate on opposite sides thereof, and are adapted to enter the roller in planes at right angles to the plate to provide additional means for fixing the anchor to the roller and anchoring the inner end of the spring against rotation.

Radial lugs 19 are arranged on the anchor in a circumferential series having a diameter slightly less than the diameter of the roller recess for guiding the anchor therethrough and assuring centering of the point member with reference to the floor of the roller recess.

The sleeve 8 may be provided with slots 20 to receive pawls 21 pivotally mounted on the cap 7 for latching the roller in selected position. A washer 22 may be installed in the cap 7 to receive the outer end of the shaft. The cap may be fixed to the wooden roller body by points 23 formed by indenting the cylindrical portion of the cap to press the points into the body.

In assembling a spring roller device having the elements above described, the cap 7 is slidably moved over the shaft to the shoulders 6, the washer is installed, and the sleeve 8 is then moved over the shaft and forcibly pressed along the ribbed portion to effect secure engagement of the sleeve with the shaft in such position that the shaft is free to rotate in the bearing aperture of the cap.

The spring is mounted on the anchor, and then moved over the shaft and its opposite end mounted on the sleeve, the anchor incidentally moving into receiving and supporting relation with the inner end of the shaft. The unit thus formed is then inserted in the recess of the roller body, the lugs on the anchor centering the plate in the recess to assure positioning of the entrance edge on a diameter of the floor of the roller recess.

Force is applied to the outer end of the shaft for pressing the point of the anchor into the floor of the roller recess.

The several elements are proportioned to locate the cap 7 over the end of the roller body when the point of the anchor is embedded in the floor of the recess, and the cap may then be indented to latch the cap to the roller for rotation therewith.

When the roller is mounted in casing brackets, the shaft will be latched against rotation. Rotation of the roller will effect rotation of the anchor and tensioning of the spring. The roller may be latched with the spring in tensioned condition, and when the roller is released the spring will return the same to original position.

What I claim and desire to secure by Letters Patent is:

1. In a spring roller, a cylindrical body having an axial recess in one end, and a roller-operating unit adapted to be mounted in said recess and including a shaft having a flattened tip and longitudinal ribs adjacent said tip, a sleeve engaging said ribs and latched thereby to the shaft, a coil spring on the shaft having one end anchored to said sleeve, an anchor member having a bearing socket to receive the opposite end of the shaft, the opposite end of the spring being anchored to said anchor member, and means for fixing the anchor member in the recess of the body.

2. In a spring roller including a body having a recess in one end, a roller-operating unit including a shaft having a flattened outer end forming a shoulder and longitudinal ribs spaced from said shoulder, a cap rotatably mounted on the shaft between the shoulder and the ribs, a sleeve frictionally engaged with said ribs for retaining the cap, a coil spring mounted on the shaft and having one end engaged with said sleeve, and means fixed to the other end of the spring for anchoring the spring in said recess.

3. In a device of the character described, a body having a cylindrical recess, a coil spring, an anchor member secured to the inner end of the spring and having an entrance edge adapted to be driven into the inner end of the recess, a shaft extending in the spring and having an inner end rotatable in said anchor member, the outer end of the spring being anchored to the outer end of the shaft, and radial lugs on the anchor member for guiding the same centrally of the recess upon assembly of the device for causing the entrance edge to enter the inner end of the recess on a diameter thereof.

4. In a spring roller including a cylindrical body having an axial recess and a cap adapted for engagement with the outer end of said body, a coil spring, an anchor fixed to the inner end of said spring and engageable with said body to latch the inner end of the spring to the body, a shaft insertable through said cap and spring to mount the inner end of said shaft rotatably in said anchor, means including a sleeve engageable with the outer end of said spring, and ribs on said shaft engageable with said sleeve for latching said spring to said shaft.

In testimony whereof I affix my signature.

TANDY B. THURMAN.